July 31, 1951
E. MAILE
2,562,431
MOBILE AMPHIBIOUS COLLAPSIBLE PONTOON BRIDGE
Filed April 1, 1948
10 Sheets-Sheet 1.
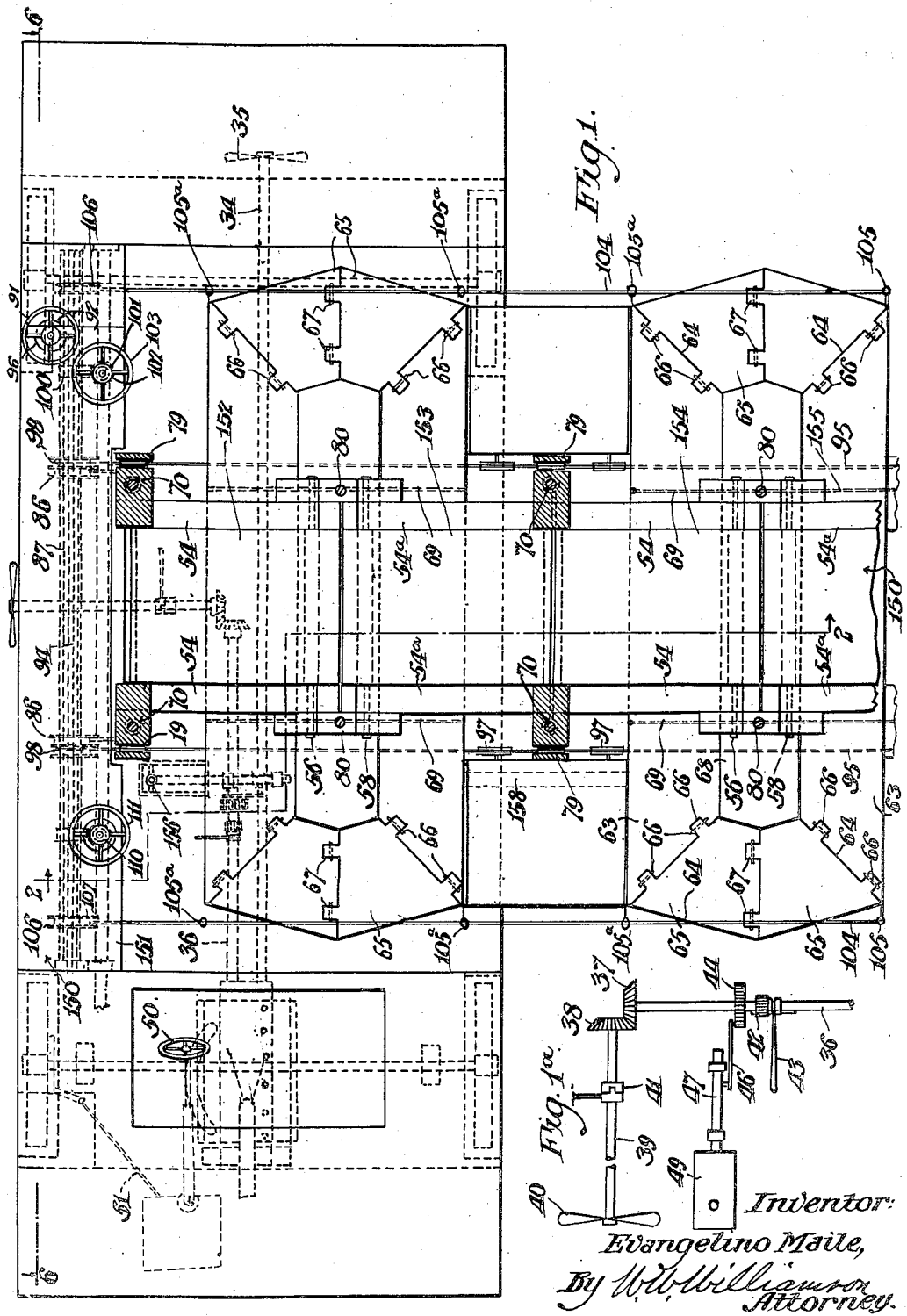

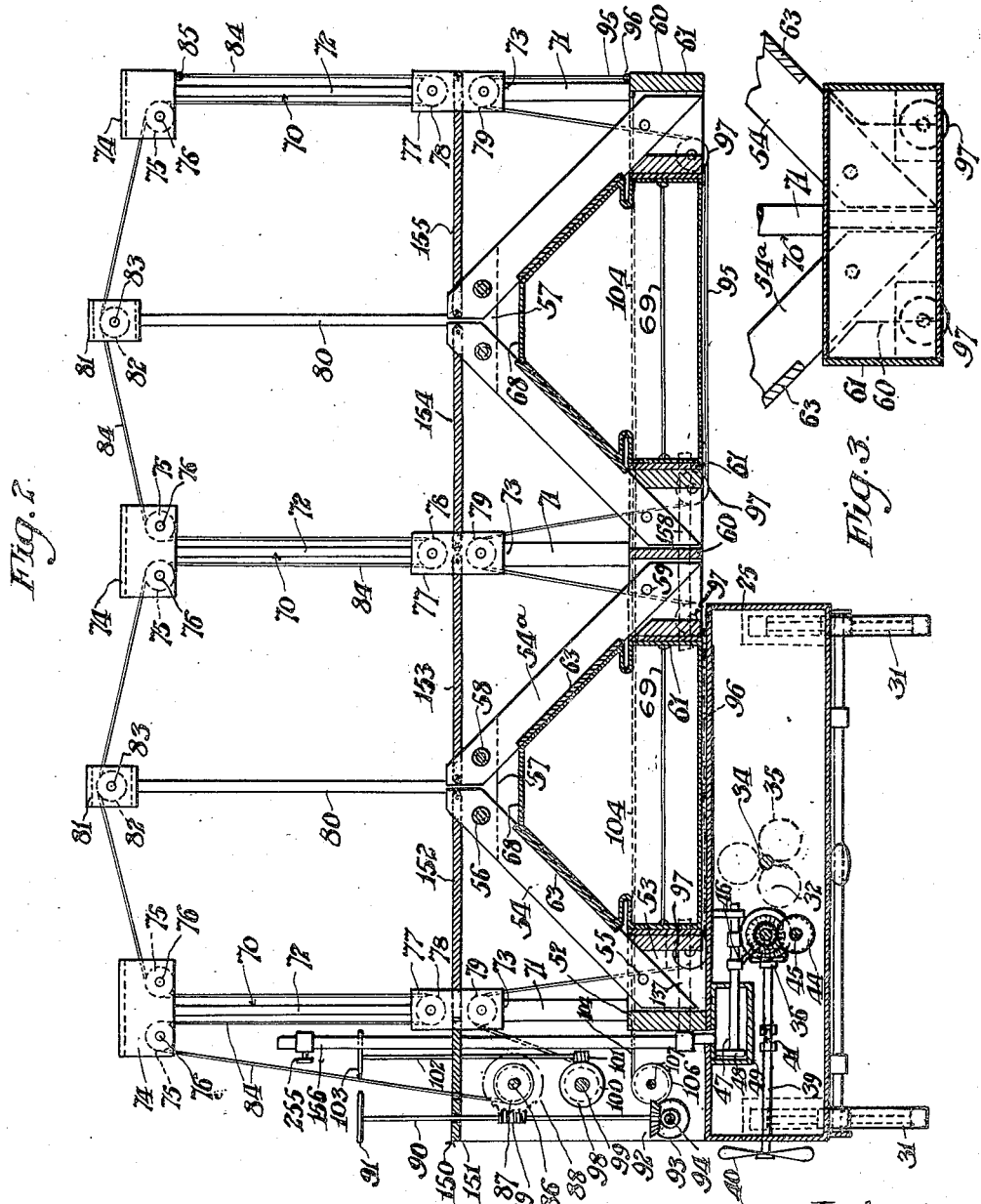

July 31, 1951  E. MAILE  2,562,431
MOBILE AMPHIBIOUS COLLAPSIBLE PONTOON BRIDGE
Filed April 1, 1948  10 Sheets-Sheet 4

Inventor:
Evangelino Maile,
By Williamson
Attorney.

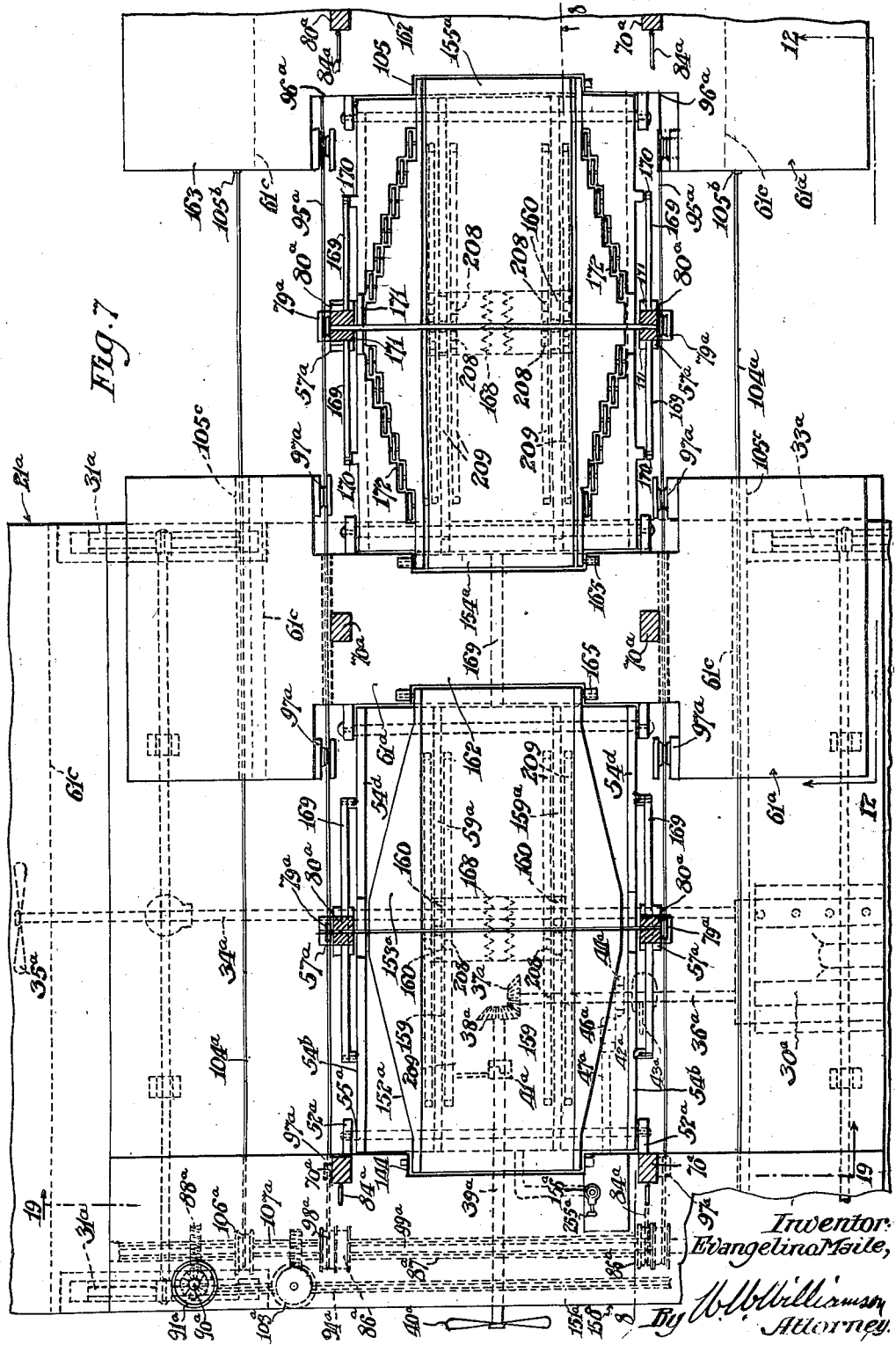

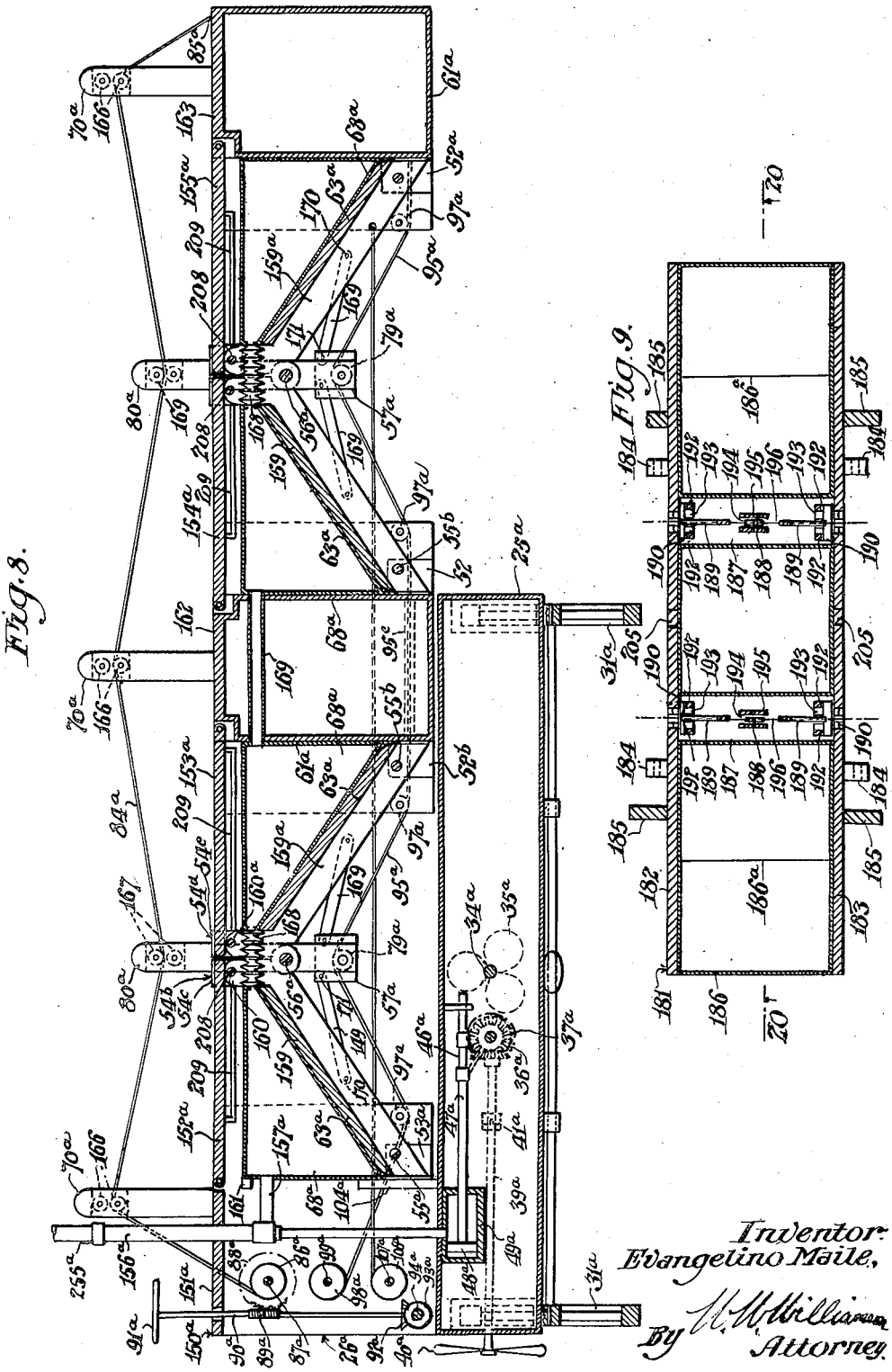

July 31, 1951    E. MAILE    2,562,431
MOBILE AMPHIBIOUS COLLAPSIBLE PONTOON BRIDGE
Filed April 1, 1948    10 Sheets-Sheet 7

Inventor:
Evangelino Maile,
By W. W. Williamson
Attorney.

July 31, 1951 E. MAILE 2,562,431
MOBILE AMPHIBIOUS COLLAPSIBLE PONTOON BRIDGE
Filed April 1, 1948 10 Sheets-Sheet 8
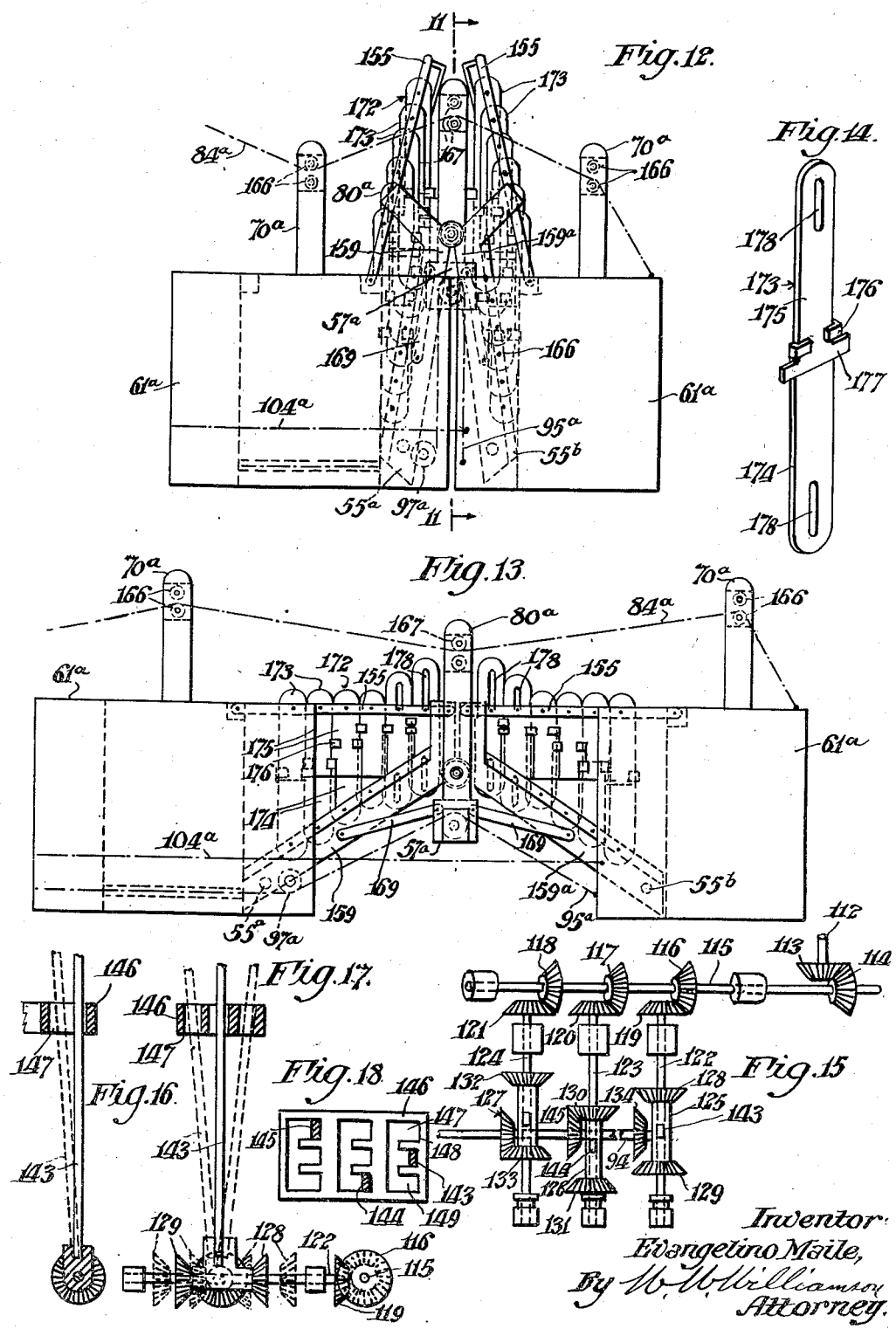

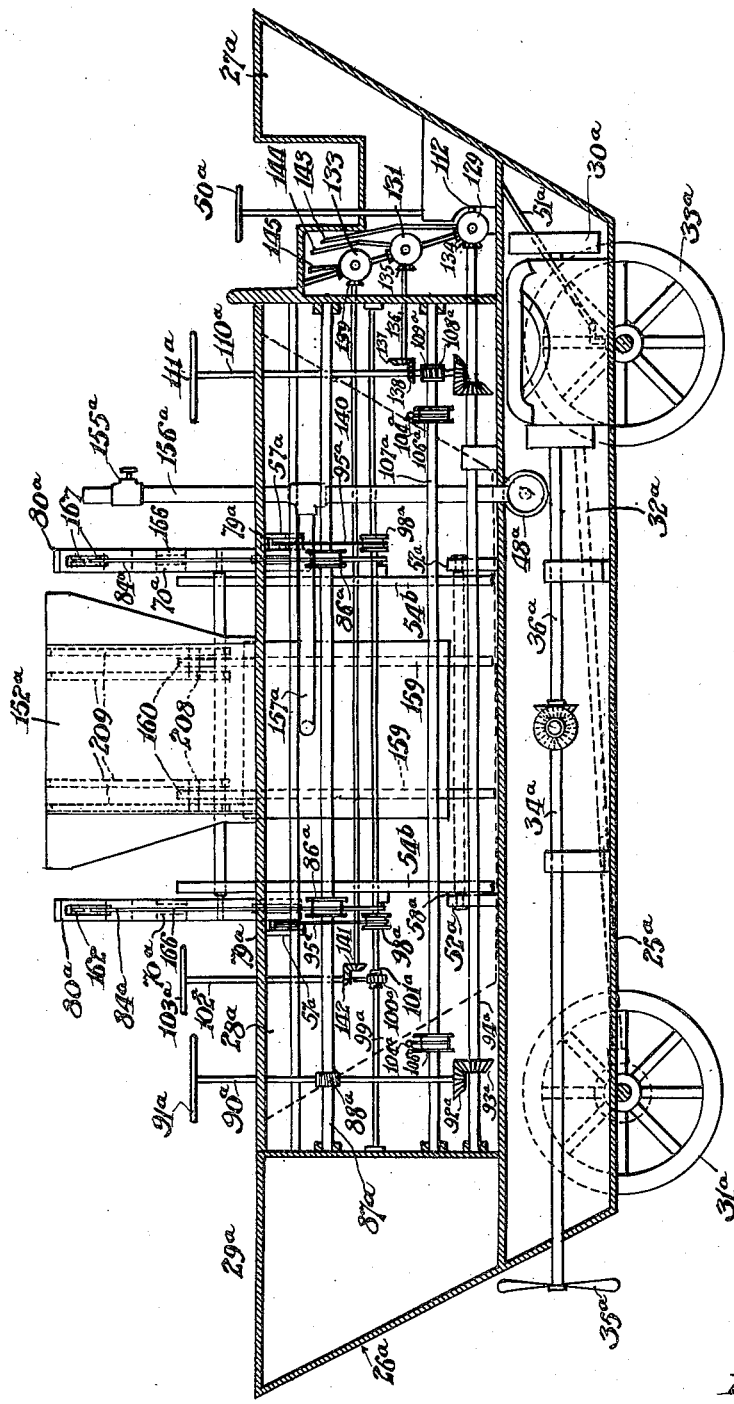

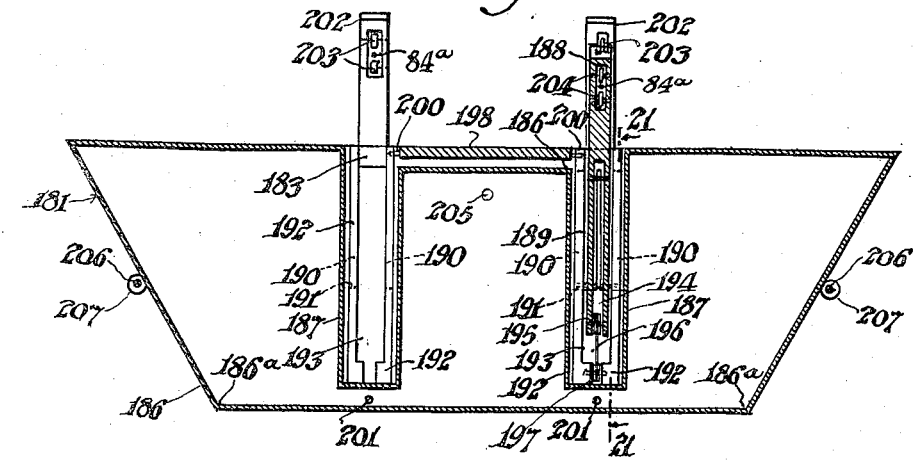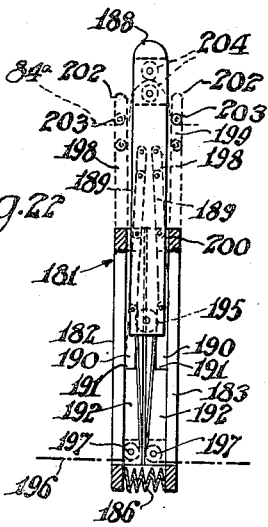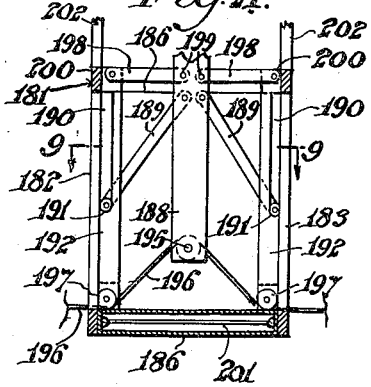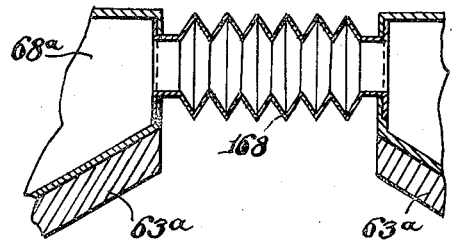

Patented July 31, 1951

2,562,431

UNITED STATES PATENT OFFICE 2,562,431

MOBILE AMPHIBIOUS COLLAPSIBLE
PONTOON BRIDGE

Evangelino Maile, Philadelphia, Pa.

Application April 1, 1948, Serial No. 18,326

7 Claims. (Cl. 115—1)

My invention relates to a new and useful mobile amphibious collapsible pontoon bridge and has for one of its objects to provide a highly efficient structure for bridging a gap between two shores of a body of water, a short distance apart and a number of the structures being used according to the space between two thi igs.

Another object is to provide a device of this character capable of being used on a ship or the shore to bridge the space from one to the other.

Another object of the invention is to provide a structure as a part of a ship, boat or the like to provide an extensible and retractable walk or gang plank to connect two ships, boats or the like for the transfer of men, equipment, cargo or other things from one to the other.

Another object of the invention is to provide a device of the character mentioned to be self-propelled forwardly and backwardly either on land or water or both.

A further object of the present invention is to provide means for propelling the apparatus sidewise to warp it into position and extend or retract the same.

With the above and other objects in view, this invention consists of the details of construction and combination of elements hereinafter set forth and then designated by the claims.

In order that those skilled in the art to which this invention appertains may understand how to make and use the same I will describe its construction in detail referring by numerals to the accompanying drawings forming a part hereof, in which:

Fig. 1 is a top plan view expanded.

Fig. 1a is a digram of one propeller and pump connections.

Fig. 2 is a section on the line 2—2 of Fig. 1.

Fig. 3 is an enlarged sectional elevation of the water-tight bearing for the struts.

Fig. 7 is a top plan view of a modification in an open or expanded condition.

Fig. 8 is a section on the line 8—8 of Fig. 7.

Fig. 9 is a section of the pontoon on the line 9—9 of Fig. 21.

Fig. 12 is a fragmentary view from the line 12—12 of Fig. 7, showing the apparatus.

Fig. 13 is a similar view showing the parts expanded.

Fig. 14 is an enlarged perspective view of one of the slides.

Fig. 15 is a diagrammatic plan view of the cable controls.

Fig. 16 is a detail view of the cable control operating levers.

Fig. 17 is also a detail view of the same parts at right angles to Fig. 16.

Fig. 18 is a view of the lever holding and selecting device.

Fig. 19 is a section on the line 19—19 of Fig. 7.

Fig. 20 is a section on the line 20—20 of Fig. 9.

Fig. 21 is a section on the line 21—21 of Fig. 20.

Fig. 22 is a similar view showing the parts collapsed.

Fig. 23 is an enlarged detail section of the air conduit between two adjacent inflatable chambers.

Figure 6:
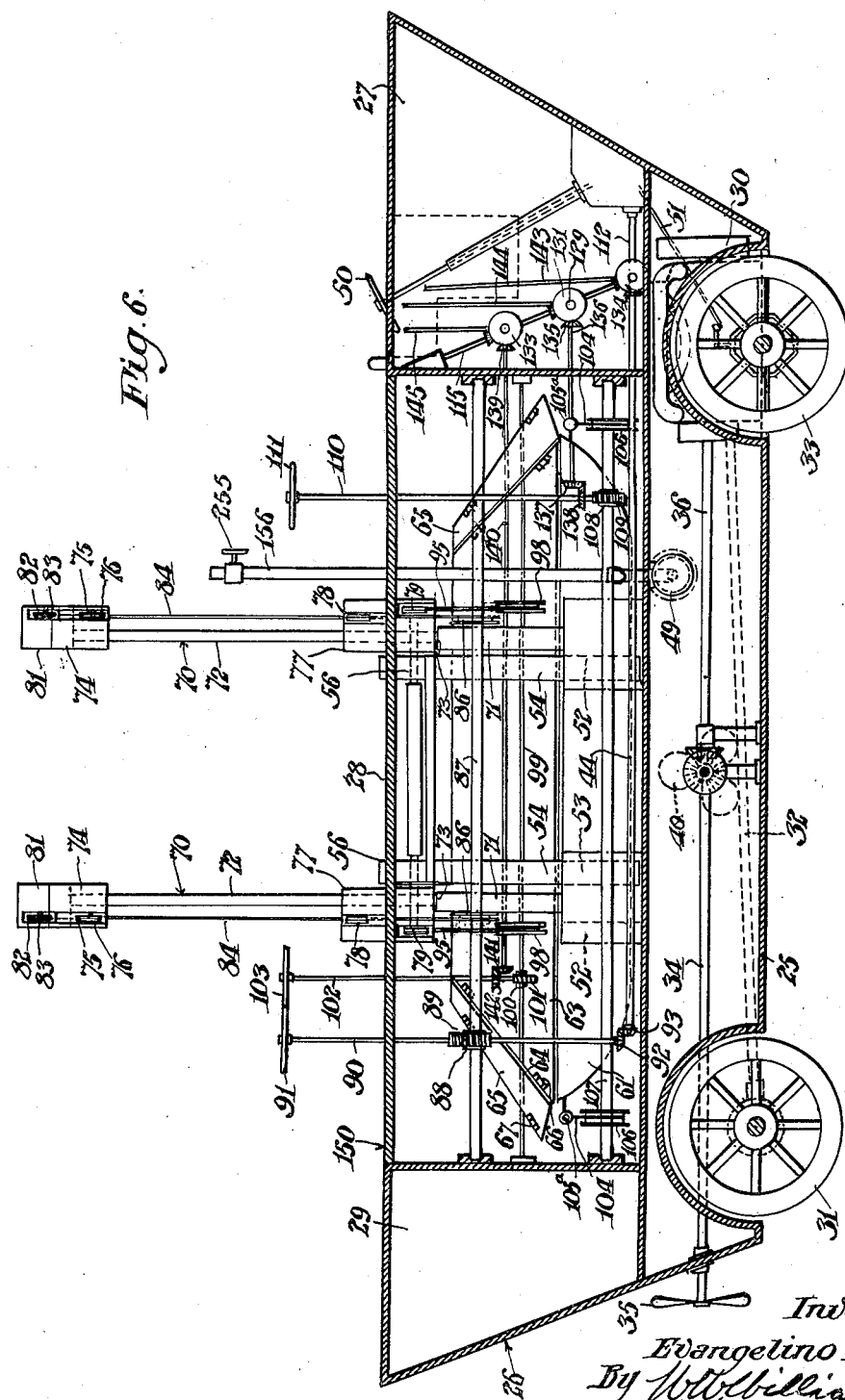
Fig. 6 is a section on the line 6—6 of Fig. 1.

In carrying out my invention as herein embodied 25, Figs. 2 and 6, represents a hollow water-tight pontoon on top of which is mounted the body 26 divided into a number of chambers, including the forward water-tight chamber 27, a central chamber 28 and a rear water-tight chamber 29.

In the pontoon is mounted a motor 30, Fig. 6, of any desirable type for driving the rear wheels 31 through the shaft 32. Front wheels 33 are also provided which, with said rear wheels, support the apparatus on land. The motor also drives a shaft 34 which projects through the rear wall of the pontoon and has a propeller 35 mounted on it for propelling the apparatus forwardly or rearwardly. A third shaft 36 is also driven by the motor and said shaft is provided with a bevel gear 37 meshing with a companion bevel gear 38 on a two-piece counter shaft 39 carrying a propeller 40 for driving the apparatus sidewise in the water. Said counter shaft is provided with a clutch 41 whereby the propeller may be permitted to remain idle or be operated when desired.

On the shaft 36, Figs. 1a, 2 and 6, is a slidable pinion 42 actuated by a shifting lever 43 to be engaged with or disengaged from a spur gear 44 on the extreme end of a short shaft 45. To the gear 44 is connected one end of a pitman 46, the opposite end being connected to the piston 48 in the pump cylinder 49 which pump is used for increasing the air pressure in certain parts of the apparatus to be presently described.

The front wheels 33 are actuated for steering the apparatus by the steering wheel 50, Figs. 1 and 6, through suitable steering gear of any well known construction including the connecting rod 51.

Figure 4:
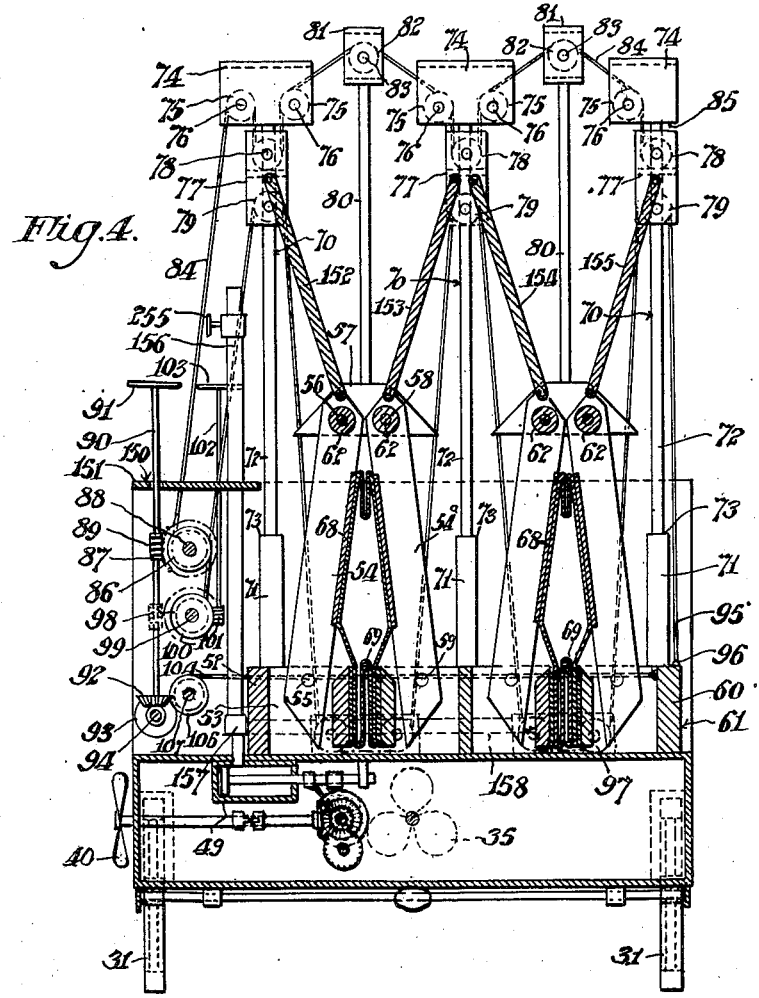
Fig. 4 is a view similar to Fig. 2 showing the parts collapsed.
Figure 5:
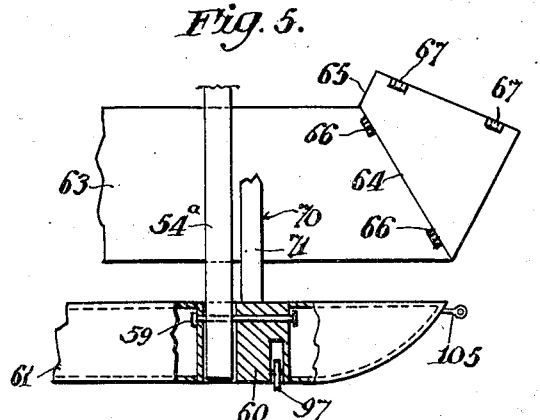
Fig. 5 is an enlarged fragmentary sectional elevation of bearing for struts and buoyant device.

Anchor blocks 52, Figs. 2, 4 and 6, are mounted on top of the pontoon 25 adjacent one side thereof and each anchor block has a recess 53 to receive the lower end of a strut 54 where it is pivoted for transverse swinging movements by a pin 55. The upper end of each strut is pivotally mounted on a pin 56 fixed in a hanger block 57. In the same hanger block is fixed a pin 58 on which is pivotally mounted the upper end of a companion strut 54a while the lower end of said companion strut is pivotally mounted on a pin 59 in the recessed block 60 as a part of the sliding or shiftable supporting pontoon 61.

The struts 54 and 54a are arranged in pairs transversely of the apparatus and pairs of said struts are arranged in sets of two or more longitudinally and between each adjacent pair is placed a spacer 62 which can be separate tubes or merely enlargements of the pivot pins 56 and 58 to brace the parts and keep them properly spaced during operation.

Between the sets of struts are mounted panels 63, Figs. 1, 2, 3 and 5, arranged in pairs and the ends of said panels are beveled, as indicated at 64, to which are hinged end panels 65 at 66 and the two end panels at either end are hinged together at 67. These panels provide a certain amount of protection for a rubber bag 68 that extends across the space between anchor blocks 52, 60 when the latter are separated as will be described below. To limit the expansion of the rubber bags each of said bags has one or more flexible cables 69 inside and secured to the sides thereof.

On each block 60 of the supporting pontoons 61 are mounted primary masts 70, Figs. 1 to 6 inclusive, preferably two to each of said supporting pontoons, so they are arranged in pairs. Each primary mast includes a lower portion 71 of large diameter and an upper portion 72 of small diameter to provide a shoulder 73. On top of each primary mast 70 is mounted a head 74 to support one or more pulleys 75 journalled on suitable shafts 76.

A pulley carrier 77 is slidably mounted on the upper smaller diameter portion 72 of each primary mast 70 and is limited in its vertical movements by the head 74 and the shoulder 73. In the upper end of each pulley carrier 77 is a top pulley 78 and in the lower end is mounted a bottom pulley 79, said pulleys being journalled on suitable shafts.

A secondary mast 80, Figs. 1, 2 and 4, is mounted on each hanger block 57 and located between adjacent pairs of primary masts in transverse straight lines. On each secondary mast 80 is a head 81 having a pulley 82 mounted therein on a shaft 83.

A lifting cable 84, Figs. 2, 4 and 6, is fixed at one end to each outermost primary mast head 74, as at 85, then extends downwardly and around the top pulley 78 in the pulley carrier 77 on the respective primary mast, then upwardly and around the pulley 75 in said outermost primary mast head 74, thence to and over the pulley 82 in the adjacent secondary mast head 81, then to and over a pulley 75 in the next primary mast head 74 and so on over the several pulleys of the successive primary and secondary mast heads until it passes over the last pulley 75 of the innermost primary mast head from which point it extends downwardly and has its other end wound on the drum 86 mounted on a longitudinal shaft 87. It is to be understood that there is one drum for each lifting cable and all of such drums are fixed on the one shaft 87.

The shaft 87 has a worm gear 88, Figs. 2, 4 and 6, thereon with which meshes a worm 89 on a vertical shaft 90 whereby the drum shaft 87 can be operated manually if necessary and for this purpose a hand wheel 91 is fixed on the vertical shaft 90. The vertical shaft 90 also has a bevel pinion 92 on its lower end which meshes with a bevel gear 93 on the longitudinal shaft 94.

An expanding and holding cable 95, Figs. 1, 2 and 6, has one end fixed at 96 to each block 60 of an extensible pontoon 61 and then extends upwardly and over a bottom pulley 79 in its respective pulley carrier 77 and then downwardly and under a pulley 97 mounted on the outermost supporting pontoon thence across the space occupied by the rubber bag and around another pulley 97 at one end of an intermediate supporting pontoon, then upwardly and around a bottom pulley 79 in the succeeding pulley carrier and so on until its opposite end is wound on the drum 98. There are as many drums as there are cables, here shown as two in number, and said drums are mounted on a longitudinal shaft 99. This longitudinal shaft 99 has a worm gear 100 fixed thereon with which meshes a worm 101 mounted on a vertical shaft 102 on which there is a hand wheel 103 whereby the expanding and holding cables 95 may be manually actuated.

The closing cables 104 have their outer ends secured at rings 105 on the outer extensible pontoon and extend to the opposite side of the apparatus where the opposite ends are wound on the drums 106 fixed on the longitudinal shaft 107. These cables pass through rings 105a on the other extensible pontoons. On the shaft 107 is a worm gear 108, Fig. 6, with which meshes a worm 109 on the vertical shaft 110 carrying a hand wheel 111 whereby the closing cables may be manually actuated if necessary.

In order to mechanically actuate the several shafts on which the cable drums are mounted, a power shaft 112, Figs. 15–18, is suitably connected to the transmission of the source of power, such as the engine 30. Said power shaft 112 has a bevel gear 113 on it that meshes with a bevel gear 114 mounted on the lower portion of an upwardly extending diagonal counter shaft 115.

On the diagonal shaft 115 are mounted several bevel gears 116, 117 and 118 which mesh with bevel gears 119, 120 and 121, respectively, mounted on the short control shafts 122, 123 and 124. On the short control shafts are mounted the sleeves 125, 126 and 127, to revolve with and slide on said short control shafts. Each sleeve carries a pair of opposed spaced bevel gears designated 128 and 129, 130, and 132 and 133. The opposed gears 128 and 129 can be shifted to alternately engage the bevel gear 134 on the shaft 94 or be caused to assume a neutral position out of engagement with the gear 134. In a similar manner the opposed gears 130 and 131 cooperate with a bevel gear 135 on the shaft 136 which carries a second bevel gear 137 that meshes with a bevel gear 138 mounted on the vertical shaft 110 whereby power and motion are transmitted to the shaft 107 for controlling the closing cables.

Likewise the opposed gears 132 and 133 cooperate with the bevel gear 139 on a shaft 140 which has another bevel bear 141 mounted on it to mesh with a bevel gear 142 on the vertical shaft 102 to transmit power and motion to the shaft 99 for controlling the expanding cables.

The pairs of opposed gears are shifted by the levers 143, 144 and 145, respectively, and each lever passes through a rack 146 having three notches 147, 148 and 149 in three spaces, one for each lever. When a lever, for example, lever 143 is in the center notch 148 the gears 128 and 129 are in a neutral position and they are out of engagement with the gear 134 but if the lever 143 is shifted to either of the other notches one of the gears 128 or 129 will be moved into mesh with the gear 134 and cause it to revolve in either direction.

A sectional platform or deck 150 consists of a stationary section 151 and several movable sections 152, 153, 154 and 155. The movable section 152 has one end pivoted between the pair of pulley carriers 77 at one side of the apparatus and the other end is pivoted between a pair of struts 54. The adjacent movable platform section 153 has one end pivoted between a pair of companion struts 54a and the other end is pivoted between a pair of intermediate pulley carriers 77. The next movable platform section 154 has one end pivoted between the same pair of pulley carriers to which the section 153 is pivoted and the other end of said movable platform section 154 is pivoted between the next adjacent pair of struts 54, and so on to the opposite side of the apparatus.

In operation, while the apparatus is closed or contracted it may be operated over roads or the ground to the vicinity of the location where it is to be used. It is then driven into a body of water until the apparatus floats. Thereafter the propellers are operated to warp the apparatus into a position with either side adjacent a bank of the body of water. The side near the bank is then anchored or made fast and the apparatus is extended by actuating the proper cables as next described.

The shafts 87 and 107 are operated either manually, or mechanically from the motor through the gear shift, in the proper directions to loosen or play out the lifting cables 84 and the closing cables 104 after the valve 255 in the intake and exhaust pipe 156 leading to the pump cylinder 49 has been opened. At or about the same time the shaft 99 is operated to wind up the expanding and holding cables 95 causing the pulley blocks 77 to descend until said blocks engage and rest on the shoulders 73 of the masts 70. At this time the lower ends of the struts engage their mountings and the upper ends engage each other to act as stops. During this operation the movable sections 152 to 155 of the deck 150 are straightened out from their collapsed positions shown in Fig. 4 to their extended positions as in Fig. 2. Simultaneously the rubber bags 68 are expanded and air is drawn in through the pipe 156 and the branch pipe 157 to the nearest bag and then through connecting pipes 158 to succeeding bags. This adds bouyancy to the apparatus and during the extending actions said bags can, if desired, be gradually filled with compressed air by operating the pump 49, which will assist the extending action, or the air can be compressed after the apparatus has been completely extended. As the apparatus is extended the free side thereof is propelled out into the body of water providing a walk or driveway of considerable length. Two or more of the devices may be employed side by side to form a bridge of any desired length over the body of water to actually provide a bridge from one bank to another, or provide a pier to which ships may be made fast for loading or unloading. If it is impossible to make the apparatus directly fast to a bank, a suitable gang plank can be laid across the space between the bank and the adjacent side of the apparatus.

To collapse the apparatus, the operations set forth above are reversed. In other words, the expanding and holding cable 95 is slackened off and the cables 84 and 104 are reeled in, the former being started just ahead of the latter to initially raise the deck sections, it being understood that the valve 255 is open to permit the air to exhaust from the bags 68. This will raise the ends of the deck sections that are connected with the struts 54—54a and also elevate the upper ends of said struts thus drawing in the parts which are projecting beyond the body 26 into the latter and also folding the parts on said body into a compact space to make room for the formerly projecting parts.

In the form of apparatus illustrated in Figs. 7, 8, 10, 11, 12, 13, 14 and 19 the reference numeral 25a represents the hollow water-tight pontoon on which is mounted the body 26a divided into a number of chambers, including the forward water-tight chamber 27a, a central chamber 28a and a rear water-tight chamber 29a.

In the pontoon is mounted a motor 30a, Figs. 7 and 19, of any desirable type for driving the rear wheels 31a through the shaft 32a. Front wheels 33a are also provided which, with said rear wheels, support the apparatus on land. The motor also drives a shaft 34a which projects through the rear wall of the pontoon and has a propeller 35a mounted on it for propelling the apparatus forwardly. A third shaft 36a is also driven by the motor and said shaft 36a is provided with a bevel gear 27a meshing with a companion bevel gear 38a on a two-piece counter shaft 39a, similar to the detail showing in Fig. 1a, carrying a propeller 40a for driving the apparatus sidewise in the water. Said counter shaft is provided with a clutch 41a whereby the propeller may be permitted to remain idle or be operated when desired.

Figure 10:
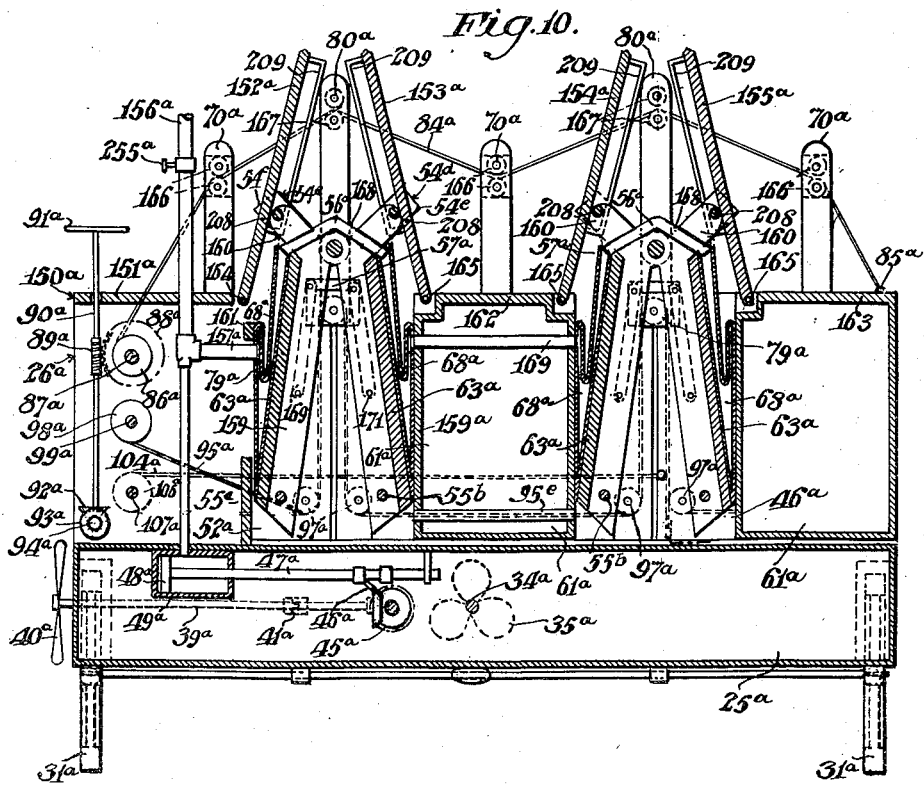
Fig. 10 is a view similar to Fig. 8 showing the parts closed or collapsed.
Figure 11:
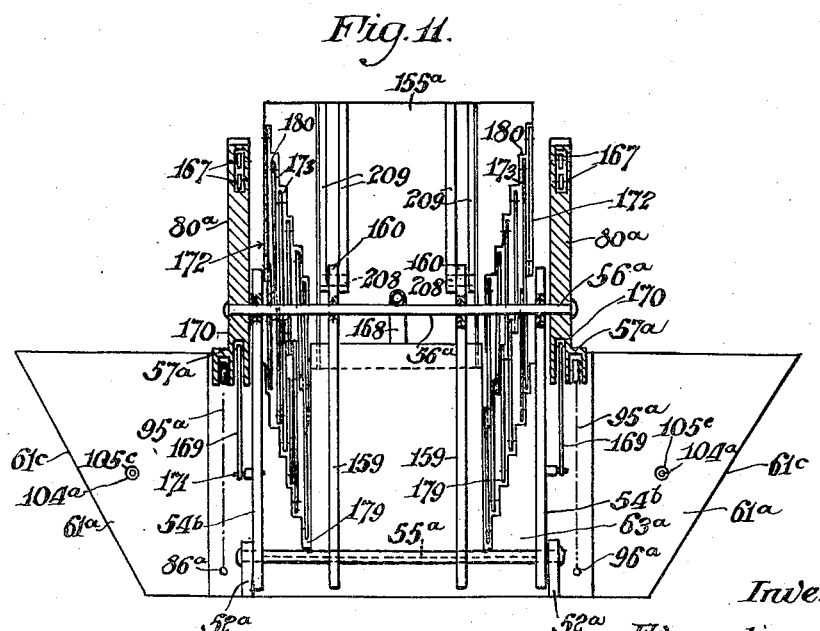
Fig. 11 is a section on the line 11—11 of Fig. 12 with the apparatus closed or collapsed.

On the shaft 36a is a slideable pinion 42a, Fig. 7, actuated by a shifting lever 43a to be engaged with or disengaged from a spur gear 44a on the extreme end of a short shaft 45a, Fig. 10. One end of a pitman 46a is connected to the gear 44a while the opposite end of said pitman is connected to the piston rod 47a carrying the piston 48a in the pump cylinder 49a which pump is used for increasing the air pressure in certain parts of the apparatus to be presently described.

The front wheels are actuated for steering the apparatus by the steering wheel 50a, Fig. 19, through suitable steering gear of any well known construction including the connecting rod 51a.

Anchor blocks 52a, Figs. 7, 8 and 10, are mounted in pairs on top of the pontoon 25a adjacent one side thereof and pivoting means 55a, such as a shaft or pins, are supported by said anchor blocks. A pair of outer struts 54b, spaced longitudinally of the apparatus, have their lower ends mounted on the pivoting means 55a and have outwardly extending angular ends 54c and said struts are pivoted adjacent their upper ends, at the angles formed by the angular ends, on a pivoting means 56a fixed in hanger blocks 57a. On the pivoting means 55a are mounted the lower ends of the intermediate struts 159 which also have angular upper ends 160, the terminals of which are convex to ride under the deck planks to be later described. On the pivoting means 56a are mounted the upper ends of a pair of companion outer struts 54d also having angular ends 54e which coact with the other outer struts, being set into one another similar to a hinge. The lower end of the companion outer struts 54d are mounted on the pivoting means 55b fixed in anchor blocks 52b mounted on a sliding or shiftable supporting pontoon 61a of which there may be one or a plurality.

Similarly, companion intermediate struts 159a having angular upper ends are mounted adjacent said upper ends on the pivoting means 56a and their lower ends are mounted on the pivoting means 55b. The above refers to one set of struts and these may be repeated as many times as desired to provide a projectable structure of any preferred length and the duplicate parts will be designated by the same reference numerals.

On the set of struts comprising those numbered 159 and 54b, Figs. 7 and 8, and the similar set designated 159a and 54d, are mounted the panels 63a. These panels provide a certain amount of protection and support for the rubber bags 68a, one located above or adjacent each set of struts. Other parts of the bags are supported by the side walls of the shiftable pontoons 61a which have inclined side walls 61c, or a hanger bar 161. The tops of the bags are unsupported and can fold up when the apparatus is retracted as shown in Fig. 10 or may be stretched taut when the apparatus is extended as shown in Fig. 8.

A sectional platform or deck 150a, Figs. 7, 8 and 10, consists of a stationary section 151a and several movable sections 152a, 153a, 154a and 155a plus the top walls 162 and 163 of the shiftable pontoons 61a. The outer end of the movable section 152a of the deck is pivoted at 164 to the stationary deck section 151a and the outer ends of other movable deck sections are pivoted at 165 to the respective shiftable pontoons 61a.

The convex ends of the pairs of struts 159 and 159a, Figs. 8 and 10, ride under and engage the deck sections to support the latter and assist in raising them as the apparatus is collapsed. To draw the deck sections down a pin 208 is mounted in the upper end of each of said struts 159 and 159a and the ends of said pin slide in the pair of parallel guides 209 secured to the underneath surface of the movable deck sections. There are two pairs of these guides, one pair adjacent each side of each deck section.

On the stationary deck sections and on each of the shiftable pontoons 61a are mounted primary masts 70a, Figs. 7, 8, 10, 12 and 13, arranged in pairs and in the upper ends are mounted vertically associated pulleys 166 with the rims contiguous one another.

Secondary masts 80a are mounted on each of the hanger blocks 57a and may be formed as an integral structure and in said secondary masts are mounted a pair of coacting pulleys 167 in vertical alignment so the rims are adjacent one another in each pair.

Lifting cables 84a each has one end fixed to the outermost shiftable pontoon 61a, as at 85a, then they extend upwardly and between the pulleys 166 on the adjacent masts 70a, then between the pulleys 167 on the adjacent masts 80a, then between the pulleys 166 on the next masts 70a, then between the pulleys 167 on the successive masts 80a and finally between the pulleys 136 on the masts 70a which are mounted on the stationary section 151a of the deck 150a. These lifting cables 84a then extend downwardly and are wound on drums 86a mounted on a longitudinal shaft 87a beneath the stationary section of the deck.

The shaft 87a, Figs. 7, 8 and 10, has a worm gear 88a thereon with which meshes a worm 89a on a vertical shaft 90a projecting through the deck whereby the drum shaft 90a can be operated manually if necessary and for this purpose a hand wheel 91a is fixed on said vertical shaft 90a. The hand operated vertical shaft 90a also has a bevel pinion 92a on its lower end which meshes with a bevel gear 93a on the longitudinal shaft 94a.

Expanding and holding cables 95a, Figs. 7, 8 and 10, each has one end fixed at 96a to the outermost movable pontoon and said cables then run successively over pulleys 79a in the hanger blocks 57a and under pulleys 97a on portions of the intermediate movable and the stationary pontoons preferably through tubes 95e, and finally to drums 98 on which said cables are wound. The drums 98a are mounted on a longitudinal shaft 99a which has a worm gear 100a thereon meshing with a worm 101a on the vertical shaft 102a provided with a hand wheel 103a whereby the expanding and holding cables 95a may be manually actuated.

The closing cables 104a, Figs. 7, 8 and 10, have their outer ends secured to the outer movable pontoon at 195b and extend to the opposite side of the apparatus where the other ends of said closing cables are wound on drums 106a fixed on the longitudinal shaft 107a. If said cables 104a pass through pontoons, tubes 105c are provided for this purpose. On the shaft 107a is a worm gear 108a, Fig. 19, with which meshes a worm 109a on the vertical shaft 110a carrying a hand wheel 111a whereby the closing cables may be manually actuated when and if necessary.

The several drum shafts are mechanically operated as set forth in connection with the first described form of the invention and the same reference numerals are applied as shown in Figs. 15 to 18. In other words, the shaft 94a is connected with the gear shift mechanism through the bevel gear 134; the shaft 107a is connected with the gear shift mechanism through the bevel gear 135, the shaft 136 and the bevel gears 137 and 138; and the shaft 99a is connected with said gear shift mechanism through the bevel gear 139, the shaft 140 and the bevel gears 141 and 142.

The two bags 68a, Figs. 8 and 10, between adjacent pairs of pontoons are joined by an extensible bellows conduit 168, shown in detail in Fig. 23 and those on opposite sides of a pontoon are connected by rigid or other suitable conduit 169.

From the pump cylinder 49a, Fig. 8, extends an intake-exhaust pipe 156a having a valve 255a interposed therein beyond the branch conduit 157a which leads to the innermost bag for supply fluid, preferably air, to the series of bags.

In order to add rigidity to the structure between the pontoons and especially the struts over which the bags are located, toggle levers 69 are pivoted at 170 to the struts and at 171 to the hanger blocks 57a which are provided with slots to receive the toggle levers when the apparatus is collapsed as shown in Fig. 10.

Particular attention is called to the shape of each movable pontoon, in plan, Fig. 7, wherein it is disclosed that said pontoons each have full width ends and a reduced waist, the latter providing a recess between adjacent pontoons to house the lower parts of the struts and associated elements, when the apparatus is retracted. At such time the larger end portions will abut one another and present, in effect, an unbroken surface at the sides and along the top in the region of the larger ends.

In operation, while the apparatus is closed or retracted it may be propelled over land and/or water to a location for use. After one side has been made fast to a bank the other side is extended by operating the proper cables as described below.

The shafts 87a and 107a are actuated either manually, or mechanically from the motor through the gear shift, in the proper directions to loosen or play out the lifting cables 84a and the closing cables 104a, after the valve 255a in the intake-exhaust pipe 156a leading to the pump cylinder 49a has been opened. At or about the same time the shaft 99a is operated to wind up the expanding and holding cables 95a causing the hanger blocks 57a and the secondary masts 80a to descend until the upper ends of the struts of adjacent pairs engage each other and the lower beveled end of said struts engage their mountings which act as stops to limit the movements.

During this operation the movable deck sections 152a swing downward into the horizontal position illustrated in Fig. 8. At the same time the rubber bags 68a are expanded and air is drawn in through the pipe 156a and the branch pipe 167a to the nearest bag and through the expansible bellows conduits 168 and the conduit 169 to succeeding bags. This adds buoyancy to the apparatus and during the extending operations said bags can, if desired, be filled with compressed air by operating the pump 49a, which will assist the extending action, or the air can be compressed after the apparatus has been completely extended.

As the apparatus is extended the free side thereof is propelled out into the body of water providing a walk or driveway of considerable length. Any number of units may be employed in conjunction with one another to provide a complete temporary structure of desirable length and width.

To collapse or retract the apparatus, the operations are reversed and the movable pontoons will be drawn towards one another and towards the stationary pontoon causing the struts to swing upwards into the positions shown in Fig. 10. When the parts are thus retracted the bags 68a will collapse and some parts thereof will be folded while the expansible conduits 168 will stretch or expand and bend over the pivoting means 56a. It is to be understood that during the retracting operations the valve 255 is open and the pump 49a is stopped.

In order to protect any vulnerable parts, such as the pontoons, armor bulkheads 172, Figs. 7, 11, 12 and 13, are provided each of which is comprised of a multiplicity of sectional slats 173, each slat including a lower section 174, Fig. 14, and an upper section 175. One section, as 174, has a slide socket which may be composed of two arms 176 which are bent from the sides of the section at its inner end and the other slat section, as 175 as slidably mounted in the socket and has stops 177 which engage the walls of the socket to limit the projecting movements of the slat sections. Some of the slats have longitudinal slots 178 adjacent their outer ends to permit movements between the supporting elements and the slotted slats under certain conditions as will be more fully explained below.

The slats are arranged in staggered or offset relation to one another with the lower ends pivotally connected to the panels 63a within the openings 179 of step-like formation and the upper ends are pivotally connected to the certain of the deck sections 155a also within openings 180 of step-like formation. Due to the inclination of the panels 63a the slats decrease in length from the outer ends of the armor bulkheads toward the centers and those closest to the centers of said armor bulkheads have the slots 178 whereby the centermost slats and the deck sections and the panels can move relative to one another after the slat sections are retracted to the fullest possible extent.

In order to make the structure even more compact when the parts are retracted, I have shown in Figs. 9, 20, 21 and 22, in particular, a collapsible or foldable pontoon 181 which may be substituted for any of the movable pontoons previously described.

A collapsible pontoon includes two side walls 182 and 183 have anchor blocks 184 attached thereto, which blocks have holes for the reception of the pivot pin to pivot the struts, such as those numbered 54. Also said sides are provided with boards or panels 185 that provide spaces between companion boards to receive and house the struts and other parts of the mechanism, the same as the waist portions of the pontoons hereinbefore described.

Between the sides of each of the collapsible pontoons and forming a part of such pontoon is an air and water tight rubber like bag 186 which is shaped to provide two recesses 187 and this bag is foldable or collapsible when the sides are drawn towards each other. The ends of the bag are inclined upwardly and outwardly from the lines 186a.

For the purpose of retracting and projecting the sides and thereby collapsing or opening the bag, floating masts 188, Figs. 21 and 22, are provided that are located between the sides within the bag recesses 187. The upper ends of oppositely disposed levers 189 are pivoted to each mast and have T-shaped lower ends that engage and run in guideways 190 having stop shoulders 191 at the bottoms thereof. These guideways are formed in companion posts 192 fastened in pairs to the inside faces of both sides 182 and 183 and the spacing of said posts form longitudinal recesses 193 to receive the edges of a mast 188 as the pontoon is collapsed or retracted.

The lower parts of the masts are bifurcated to provide openings 194, Fig. 20, within which the levers 189 are pivoted and in which said levers are housed when the apparatus is retracted. In said openings 194 at the lower ends of the masts are also journalled pulleys 195 over which run the expanding cables 196 that also pass under pulleys 197 for final winding upon drums such as those previously referred to by the numeral 99.

Pivoted to the masts and lying within the space between are some of the deck sections 198, Fig. 20. Actually the inner ends of the deck are pivoted at both sides to the separate masts at 199 and the outer ends are pivoted, as at 200, at both sides to the inside posts 192 which are located against the same wall, as 182.

The upper ends of the sides 182 and 183 are limited in their outward or separating movements by the deck sections and in order to control the lower ends of said sides and prevent damage to the rubber-like bag, stop cables 201 have their ends connected to the sides through the walls of the bag.

For cooperation with the floating masts 188 are other masts 202, Figs. 20, 21 and 22, similar to masts 70a, Fig. 10, and said other masts 202 are mounted on the sides 182 and 183 in line with said floating masts. The masts 202 have pulleys 203 at their upper ends and the floating masts have pulleys 204 at their upper ends. The lifting cables similar to cables 84a, pass between the pulleys on the upper ends of the masts and is connected to a drum on an operating shaft 87a, Fig. 8 for lifting the floating masts to retract the sides and thereby collapse the pontoon and the bag when the exhaust is open.

To inflate the bag 181, there are provided one or more conduits 205 for the passage of air to said bag and the same conduit is used for deflation or as an exhaust.

The closing cables 206, Fig. 20, have their far ends fastened to suitable attaching means, such as rings, on the outermost pontoon and then passes through parts of the structure, as shown in Fig. 7, or may pass through eyelets 207 positioned on the inclined ends of the bags and especially similarly shaped end edges of the walls 182 and 183. The opposite ends of the closing cables are wound on drums 106 mounted on a shaft 107.

From the foregoing it will be apparent that I have provided a mobile collapsible pontoon bridge which may be transported over highways or other terrain under its own power and then driven into a body of water and propelled to a desirable or preselected location. As soon as the apparatus is properly located the outermost or movable pontoon is anchored to or near the bank of the body of water and the main pontoon is propelled away from the anchorage location thus extending the apparatus to form a floating pathway or bridge over which pedestrians and vehicles may pass from one shore line to another, to and from a ship and the shore or other suitable locations.

Of course I do not wish to be limited to the exact details of construction herein shown and described as these may be varied within the scope of the appended claims without departing from the spirit of my invention.

Having described my invention what I claim as new and useful is:

1. A mobile amphibious collapsible pontoon bridge comprising a buoyant vehicle body including a stationary deck section, running gear on which said body is mounted for travel on land, a propeller on a shaft projecting from the rear end of said body, another propeller on a second shaft projecting from one side of said body approximately midway the length thereof, a motor inside of said body, means to selectively transmit motion from the motor to the running gear and propellers, a series of collapsible pontoons hingedly connected to one another within the vehicle body and projectable from the side thereof opposite the location of the side propeller, movable deck sections hinged to portions of the projectable pontoons and to the stationary deck section of the vehicle body to lie in the same horizontal plane when the projectable pontoons are extended and fold up when said pontoons are collapsed within the vehicle body, and means actuated by the motor in said vehicle to operate the pontoons and movable deck sections in unison.

2. The structure according to claim 1 wherein the projectable pontoons include pliable inflatable bags.

3. A mobile amphibious collapsible pontoon bridge comprising a buoyant vehicle body including a stationary deck section, running gear on which said body is mounted for travel on land, a propeller on a shaft projecting from the rear end of said body, another propeller on a second shaft projecting from one side of said body intermediate the ends thereof, a motor inside of said body, means to selectively transmit motion from the motor to the running gear and propellers, a series of interconnected collapsible and projectable pontoons, a portion of the innermost one attached to the vehicle body and the others being projectable over a side of said vehicle body, interconnected inflatable means mounted in said vehicle body and pontoons, a valve controlled passageway connected with said inflatable means located in the vehicle body, movable deck sections hingedly attached to the stationary deck section and to the pontoons whereby the projection of the latter will extend the movable deck sections into a horizontal line with the stationary deck section to provide a runway and the collapsing of said pontoons will fold up the movable deck sections into upright zig-zag relation, and means to project the outer ones of the series of pontoons outwardly beyond the side of the vehicle body and simultaneously extend the deck sections and expand said inflatable means.

4. The structure according to claim 3, in combination with means operated by the motor to mechanically actuate the pontoon projecting means, and other means connected with the first mentioned means to manually operate said pontoon projecting means independently of the motor.

5. The structure according to claim 3 wherein each pontoon includes two solid side walls, an air and water tight pliable bag between said side walls, said bag having two spaced apart recesses intermediate its ends, two pairs of guides in each recess, one pair adjacent each of the sides of the pontoon, a floating mast in each recess between the pairs of guides in the same recess, oblique levers having their upper ends pivoted to the mast within the same recess and having their lower ends slidably mounted in their respective guides which are provided with stops to limit the descent thereof, deck sections pivoted to each pair of guides in which one member of each pair is in a separate recess, and also pivoted to the opposed masts in separate recesses, fixed masts at opposite sides of the pontoon in line with each floating mast, cables engaging pulleys on the upper ends of the aligned floating and fixed masts for elevating said floating masts to collapse the pontoon sides, and other cables engaging pulleys on the lower ends of the floating masts and the guides for lowering said floating masts to expand the side of the pontoon.

6. The structure according to claim 5, in combination with stop cables of a length approximately equal to extended width of the bag and having their ends secured to the side walls of the pontoon.

7. The structure according to claim 5 wherein each of the guides consists of a pair of companion posts spaced apart a distance equal to the thickness of a floating mast whereby the latter may nest between each pair of cooperating guide posts located at opposite sides of the pontoon.

EVANGELINO MAILE.

REFERENCES CITED

The following references are of record in the file of this patent:

UNITED STATES PATENTS

| Number | Name | Date |
|---|---|---|
| 1,391,421 | Sokolowski et al. | Sept. 20, 1921 |
| 1,821,310 | King | Sept. 1, 1931 |
| 1,854,336 | King | Apr. 19, 1932 |
| 2,233,240 | Boldis et al. | Feb. 25, 1941 |
| 2,355,473 | Savage | Aug. 8, 1944 |
| 2,453,149 | McCutchen | Nov. 9, 1948 |